US011521794B2

(12) United States Patent
Akuzawa et al.

(10) Patent No.: US 11,521,794 B2
(45) Date of Patent: Dec. 6, 2022

(54) RESONANCE-TYPE POWER TRANSFER COIL

(71) Applicant: Mitsubishi Electric Engineering Company, Limited, Chiyoda-ku (JP)

(72) Inventors: Yoshiyuki Akuzawa, Chiyoda-ku (JP); Yuki Ito, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 707 days.

(21) Appl. No.: 16/477,948

(22) PCT Filed: Mar. 10, 2017

(86) PCT No.: PCT/JP2017/009734
§ 371 (c)(1),
(2) Date: Jul. 15, 2019

(87) PCT Pub. No.: WO2018/163409
PCT Pub. Date: Sep. 13, 2018

(65) Prior Publication Data
US 2019/0371521 A1 Dec. 5, 2019

(51) Int. Cl.
*H01F 38/14* (2006.01)
*H02J 50/12* (2016.01)
*H01F 27/32* (2006.01)

(52) U.S. Cl.
CPC .............. *H01F 38/14* (2013.01); *H01F 27/32* (2013.01); *H02J 50/12* (2016.02)

(58) Field of Classification Search
CPC ........... H01F 38/14; H01F 27/32; H02J 50/12
USPC ....................................................... 336/225
See application file for complete search history.

(56) References Cited

U.S. PATENT DOCUMENTS

| 4,503,605 | A | 3/1985 | Buckley | |
|---|---|---|---|---|
| 6,138,343 | A * | 10/2000 | Hill | H01F 41/066 29/605 |
| 8,901,776 | B2 * | 12/2014 | Urano | H01F 38/14 307/104 |
| 9,634,392 | B2 * | 4/2017 | Saito | H04B 5/0087 |
| 2002/0021817 | A1 | 2/2002 | Miller | |
| 2011/0198940 | A1 | 8/2011 | Urano | |
| 2012/0019075 | A1 * | 1/2012 | Cho | H02J 50/12 29/605 |
| 2013/0328410 | A1 * | 12/2013 | Georgakopoulos | H01F 27/006 307/104 |
| 2014/0028112 | A1 * | 1/2014 | Hui | H01F 38/14 307/104 |

(Continued)

FOREIGN PATENT DOCUMENTS

| JP | 55-38044 A | 3/1980 |
|---|---|---|
| JP | 57-194515 A | 11/1982 |
| JP | 2004-47731 A | 2/2004 |

(Continued)

OTHER PUBLICATIONS

Combined Chinese Office Action and Search Report dated Sep. 16, 2020 in Chinese Patent Application No. 201780088057.3 (with unedited computer generated English translation and English translation of Category of Cited Documents), 17 pages.

(Continued)

*Primary Examiner* — Alfonso Perez Borroto
(74) *Attorney, Agent, or Firm* — Oblon, McClelland, Maier & Neustadt, L.L.P.

(57) ABSTRACT

A conductor (31) wound into a multiple-layered helical shape, and an insulating member (32) provided between layers of the conductor are provided.

10 Claims, 4 Drawing Sheets

(56) References Cited

U.S. PATENT DOCUMENTS

| | | | | |
|---|---|---|---|---|
| 2014/0168019 A1* | 6/2014 | Hirobe | .................. | H01F 38/14 343/788 |
| 2015/0279554 A1* | 10/2015 | Ryoson | .................. | H01F 38/14 343/788 |
| 2016/0118184 A1 | 4/2016 | Ukai et al. | | |

FOREIGN PATENT DOCUMENTS

| | | | |
|---|---|---|---|
| JP | 2011-86890 | A | 4/2011 |
| JP | 2014-175865 | A | 9/2014 |
| JP | 2016-21852 | A | 2/2016 |
| JP | 2016-86034 | A | 5/2016 |

OTHER PUBLICATIONS

Combined Chinese Office Action and Search Report dated Jul. 27, 2021 in Chinese Patent Application No. 20178008057.3 (with English translation), 12 pages.

Combined Chinese Office Action and Search Report dated Dec. 17, 2021 in Chinese Patent Application No. 201780088057.3 (with English translation), 11 pages.

Extended European Search Report dated Aug. 3, 2020 in European Patent Appiication No. 17899363.0, 8 pages.

International Search Report dated May 30, 2017 in PCT/JP2017/009734 filed on Mar. 10, 2017.

Japanese Office Action dated Jun. 26, 2018 in Japanese Patent Application No. 2017-521008 (with unedited computer-generated English translation), 11 pages.

Japanese Office Action dated Nov. 6, 2018 in Japanese Patent Application No. 2017-521008 (with unedited computer-generated English translation), 11 pages.

Japanese Office Action dated Apr. 16, 2019 in Japanese Patent Application No. 2017-521008 (with unedited computer-generated English translation), 8 pages.

\* cited by examiner

RESONANCE-TYPE POWER TRANSFER COIL

TECHNICAL FIELD

The present invention relates to a resonance-type power transfer coil used in a resonance-type power transfer system.

BACKGROUND ART

With a coil used in a resonance-type power transfer system, if the number of turns in the coil is increased in order to increase inductance thereof, a conductor is densely wound in a limited space, so that parasitic capacitance (stray capacitance) between portions of the conductor increases and a resonance characteristic thereof is deteriorated. Therefore, conventionally, it is configured such that the conductor is wound into a two-layered spiral shape while securing a space between portions of the conductor, and a first layer part of the conductor and a second layer part of the conductor are alternately arranged in parallel when the coil is seen in an axial direction (refer to, for example, Patent Literature 1). As a result, the parasitic capacitance between portions of the conductor is made small.

CITATION LIST

Patent Literature

Patent Literature 1: JP 2011-86890 A

SUMMARY OF INVENTION

Technical Problem

As described above, in the conventional coil, the conductor is wound into in a two-layered spiral shape. Therefore, there is a problem that although a thickness of the coil can be reduced, an area in a width direction becomes large. Therefore, it is difficult to downsize the coil in the width direction.

In the conventional coil, the first layer part of the conductor and the second layer part of the conductor are alternately arranged in parallel. Therefore, a distance between the first layer and the second layer of the conductor is maintained constant in all parts of the conductor, and there is a problem that an effect of the parasitic capacitance in a center portion of the coil when a current flows through the coil differs from an effect of the parasitic capacitance in an outer peripheral portion of the coil. Therefore, in a case where the above-described coil is used in the resonance-type power transfer system operating at an operating frequency in a MHz band, there is a problem that a difference in parasitic capacitance between portions of the conductor affects an impedance characteristic of the coil and power transmission efficiency is deteriorated.

The present invention is achieved for solving the above-described problem, and an object thereof is to provide a resonance-type power transfer coil which can be downsized and can make the parasitic capacitance between the layers of the conductor small.

Solution to Problem

A resonance-type power transfer coil according to the present invention is characterized by including a conductor wound into a multiple-layered helical shape and an insulating member provided between layers of the conductor.

Advantageous Effects of Invention

According to the present invention, since it is configured as described above, downsizing can be achieved and parasitic capacitance between layers of a conductor can be made small.

BRIEF DESCRIPTION OF DRAWINGS

FIG. 10A is a front view illustrating the configuration example of the conductor, and FIG. 10B is a cross-sectional view illustrating the configuration example of the power transmitting coil.

DESCRIPTION OF EMBODIMENTS

Hereinafter, one embodiment of the present invention will be described in detail with reference to the drawings.

First Embodiment

Figure 1:
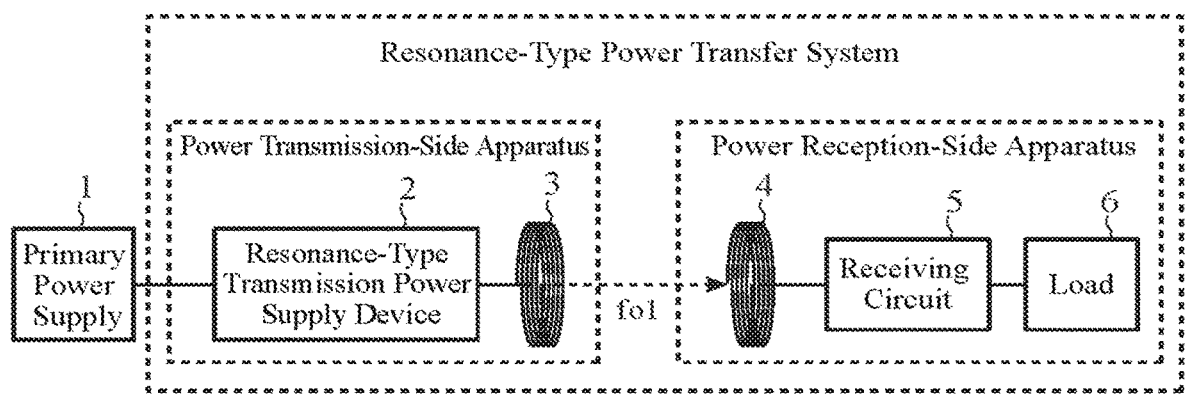
FIG. 1 is a view illustrating a configuration example of a resonance-type power transfer system according to a first embodiment of the present invention.

FIG. 1 is a view illustrating a configuration example of a resonance-type power transfer system according to a first embodiment of the present invention.

As illustrated in FIG. 1, the resonance-type power transfer system is provided with a resonance-type transmission power supply device 2, a power transmitting coil 3, a power receiving coil 4, a receiving circuit 5, and a load 6. In FIG. 1, a primary power supply 1 is connected to an input stage of the resonance-type transmission power supply device 2. The primary power supply 1 outputs DC power or AC power. The resonance-type transmission power supply device 2 and the power transmitting coil 3 form a power transmitting-side apparatus, and the power receiving coil 4, the receiving circuit 5, and the load 6 form a power receiving-side apparatus.

The resonance-type transmission power supply device 2 is a resonance-type switching inverter circuit such as an E-class inverter circuit which converts the power output from the primary power supply 1 into high-frequency power having the same frequency (including substantially the same frequency) as a resonance frequency (fo1 in FIG. 1) of the power transmitting coil 3 and outputs the high-frequency power.

The power transmitting coil (resonance-type power transfer coil) 3 performs power transfer by resonating at the same frequency (including substantially the same frequency) as the frequency of the high-frequency power output from the resonance-type transmission power supply device 2.

The power receiving coil (resonance-type power transfer coil) 4 receives the high-frequency power transferred from the power transmitting coil 3 by resonating at the same frequency (including substantially the same frequency) as the resonance frequency of the power transmitting coil 3. The high-frequency power (AC power) received by the power receiving coil 4 is output to the receiving circuit 5.

Note that, a power transferring method between the power transmitting coil 3 and the power receiving coil 4 is not especially limited and may be any one of a method by magnetic field resonance, a method by electric field resonance, or a method by electromagnetic induction. In addition, the power transmitting coil 3 and the power receiving coil 4 are not limited to a non-contact type as illustrated in FIG. 1.

A configuration example of the power transmitting coil 3 and the power receiving coil 4 is to be described later.

The receiving circuit 5 performs rectification or rectification and voltage conversion on the AC power output from the power receiving coil 4 corresponding to a specification of the load 6. That is, as the receiving circuit 5, there may be a configuration including a rectifying circuit, or a configuration including a rectifying circuit and a receiving power supply (DC/DC converter, DC/AC converter or the like). The power obtained by the receiving circuit 5 is output to the load 6.

The load 6 is a circuit or a device which functions by the power output from the receiving circuit 5.

Next, the configuration example of the power transmitting coil 3 and the power receiving coil 4 is described with reference to FIGS. 2 to 10. Note that, although the power transmitting coil 3 is hereinafter described, the same applies to the power receiving coil 4.

Figure 2:
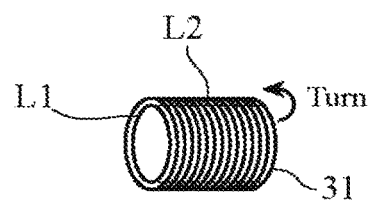
FIG. 2 is an external view illustrating a power transmitting coil in which a conductor is wound into a two-layered helical shape.
Figure 3:
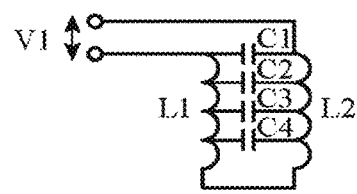
FIG. 3 is a view illustrating an equivalent circuit of the power transmitting coil illustrated in FIG. 2.

FIG. 2 illustrates an external appearance of the power transmitting coil formed of a conductor 31 wound into a two-layered helical (spiral) shape, and FIG. 3 illustrates an equivalent circuit of the power transmitting coil illustrated in FIG. 2. FIG. 2 illustrates a case where the conductor 31 is wound into a two-layered cylindrical helical shape.

The power transmitting coil illustrated in FIG. 2 is obtained by winding the conductor 31 into a two-layered helical shape. That is, as illustrated in FIG. 2, the conductor 31 is wound in an identical winding direction from a winding start point to form a first layer L1, and is turned back and further wound back on an outer periphery of the first layer L1 to a winding end point in the same winding direction as that of the first layer L1 to form a second layer L2.

In this case, as illustrated in FIG. 3, parasitic capacitance (C1 to C4 in FIG. 3) is generated between the conductor 31 of the first layer L1 and the conductor 31 of the second layer L2. Voltages ($V_{C1}$ to $V_{C4}$ in FIG. 3) in the parasitic capacitance generated when a current flows through the conductor 31 gradually become small with increasing distance from an input end (input voltage V1) ($V_{C1} > V_{C2} > V_{C3} > V_{C4}$). Note that, the parasitic capacitance is generated not only between the layers of the conductor 31 but also between portions adjacent to each other in the same layer of conductor 31, but since there is substantially no potential difference in parasitic capacitance between these portions, this may be neglected.

Figure 4:
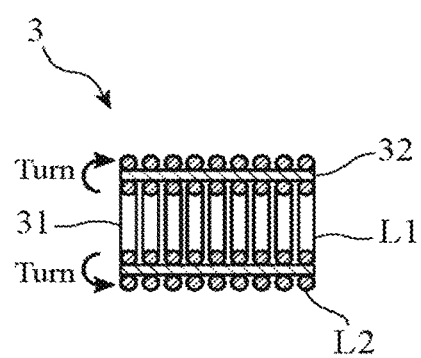
FIG. 4 is a cross-sectional view illustrating a configuration example of the power transmitting coil according to the first embodiment of the present invention.

Since the parasitic capacitance is generated between the layers of the conductor 31 in this manner, in the power transmitting coil 3 according to the first embodiment, as illustrated in FIG. 4, an insulating member 32 is provided between the layers of the conductor 31. In FIG. 4, the insulating member 32 is formed to have a uniform thickness. The insulating member 32 is formed of a material having a low dielectric constant, for example, a material such as acrylic, glass epoxy, carbon fiber reinforced plastic (CFRP), polyimide, or resin.

In this manner, by providing the insulating member 32 between the layers of the conductor 31, the parasitic capacitance between the layers of the conductor 31 can be made smaller. Also, by winding the conductor 31 into a multiple-layered helical shape, the power transmitting coil 3 can be downsized.

Note that, in a case where the input voltage V1 is small, the number of turns of the power transmitting coil 3 is small or the like, the parasitic capacitance between the layers of the conductor 31 can be made uniform even if the thickness of the insulating member 32 is made uniform.

Figure 5:
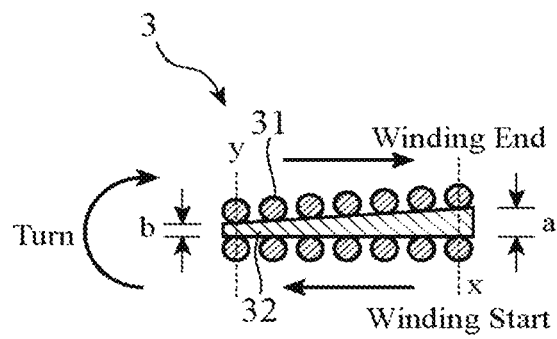
FIG. 5 is a cross-sectional view illustrating another configuration example of an insulating member of the power transmitting coil according to the first embodiment of the present invention.

FIG. 5 illustrates a case where the thickness of the insulating member 32 is made thinner from a side of the winding start point and the winding end point of the conductor 31 toward a side of a turning point. Specifically, the insulating member 32 has a thickness proportional to the voltage between the layers which is generated when the current flows through the conductor 31 in a state in which there is no insulating member 32 (corresponding to the configuration illustrated in FIG. 2). Note that, in FIG. 5, only a cross-section of a part of the power transmitting coil 3 is illustrated.

Figure 6:
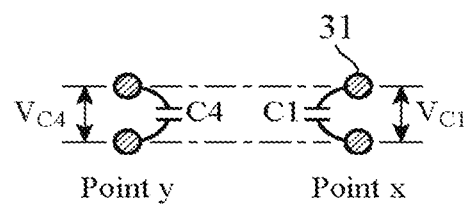
FIG. 6 is a view illustrating parasitic capacitance at a winding start point and a winding end point and that at a turning point of the conductor in a state in which there is no insulating member.

For example, as illustrated in FIG. 6, in the state in which there is no insulating member 32, the parasitic capacitance C1 between the layers of the conductor 31 at the winding start point and the winding end point (point x) is larger than the parasitic capacitance C4 between the layers of the conductor 31 at the turning point (point y). Therefore, the voltage $V_{C1}$ at the parasitic capacitance C1 is larger than the voltage $V_{C4}$ at the parasitic capacitance C4. Therefore, the thickness of the insulating member 32 is set such that a portion opposed to a portion between the layers of the conductor 31 at the winding start point and the winding end point ("a" in FIG. 5) is thicker than a portion opposed to the portion between the layers of the conductor 31 at the turning point ("b" in FIG. 5). As a result, even in a case where the input voltage V1 is large, the number of turns of the power transmitting coil 3 is large or the like, the parasitic capacitance between the layers of the conductor 31 can be made uniform.

With the configuration illustrated in FIG. 5, the power transmitting coil 3 can be further downsized and inductance of the power sitting coil 3 can be further increased as compared with the configuration illustrated in FIG. 4.

In addition, in the configuration illustrated in FIG. 5, since the parasitic capacitance between the layers of the conductor 31 can be made smaller and the parasitic capacitance can be made uniform, even if the power transmitting coil 3 is used in the resonance-type power transfer system operating at an operating frequency in a MHz band, it is possible to reduce an effect of the parasitic capacitance between the layers of the conductor 31 on an impedance characteristic of the power transmitting coil 3 and suppress deterioration in power transmission efficiency.

Also, as illustrated in FIG. 5, in a case of using the insulating member 32 having a nonuniform thickness, it is possible to use an inexpensive material (paper, tape or the like) than that in a case of using the insulating member 32 having the uniform thickness, and there are more choices of materials.

Figure 7:
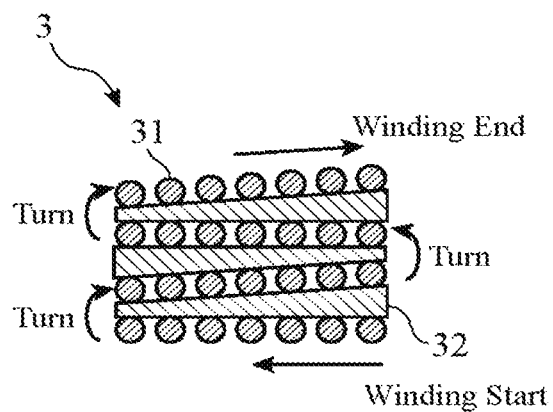
FIG. 7 is a cross-sectional view illustrating another configuration example of the power transmitting coil according to the first embodiment of the present invention.

Although the case where the conductor 31 is wound into two layers is described above, no limitation is intended to this, and the conductor 31 may be wound into three or more layers. FIG. 7 illustrates a case where the conductor 31 is wound into a four-layered helical shape. Note that, in FIG. 7, only a cross-section of a part of the power transmitting coil 3 is illustrated.

Figure 8:
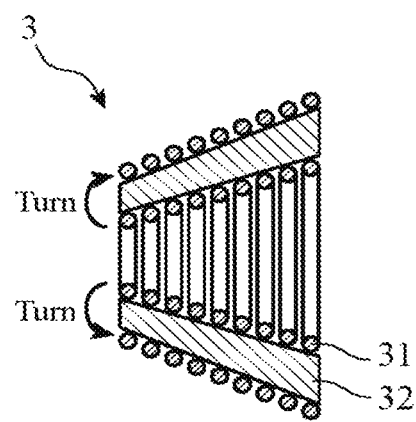
FIG. 8 is a cross-sectional view illustrating another configuration example of the power transmitting coil according to the first embodiment of the present invention.

The case where the conductor 31 is wound into a cylindrical helical shape is described above. However, no limitation is intended to this, and the conductor 31 may also be wound into a prismatic or conical helical shape, for example. FIG. 8 illustrates the power transmitting coil 3 including the conductor 31 wound into a conical helical shape.

Figure 9:
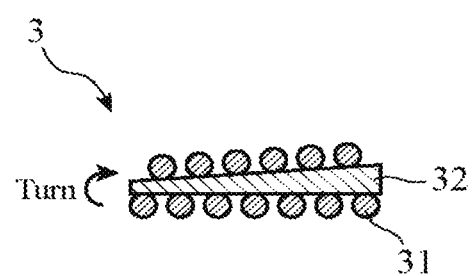
FIG. 9 is a cross-sectional view illustrating another configuration example of the power transmitting coil according to the first embodiment of the present invention.

Also, in the above description, the case where the conductor 31 are wound such that the layer parts of the conductor 31 are opposed to each other is described. However, no limitation is intended to this; for example, as illustrated in FIG. 9, the layer parts of the conductor 31 may be wound so as to be alternately arranged. Note that, in FIG. 9, only a cross-section of a part of the power transmitting coil 3 is illustrated. As a result, a distance between layers of the conductor 31 can be further increased, and the parasitic capacitance can be further made smaller.

Figure 10A:
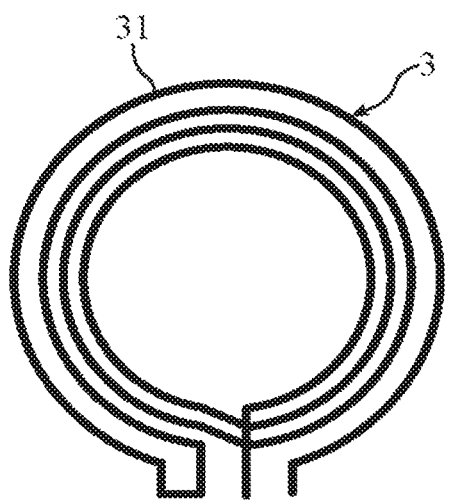
FIGS. 10A and 10B are views illustrating another configuration example of the power transmitting coil according to the first embodiment of the present invention.

The case where the conductor 31 is wound in the same winding direction in each layer is described above. However, no limitation is intended to this; for example, as illustrated in FIG. 10A, the conductor 31 may be wound on the outermost layer in a direction opposite to the winding direction in other layers. Note that, in FIG. 10A, the insulating member 32 is not illustrated. As a result, a magnetic field generated in the conductor 31 on the outermost layer can be made opposite to the magnetic field generated in the conductor 31 of the inner layer, and radiation of the magnetic field to the outside can be suppressed.

Figure 10B:
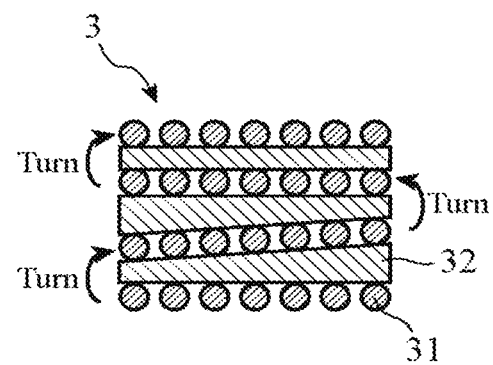

Also, in this case, as illustrated in FIG. 10B, since a potential difference between the outermost layer and a layer adjacent to the outermost layer is uniform, the thickness of the insulating member 32 can be made uniform. Note that, it is desirable that the thickness of the insulating member 32 between the inner layers be proportional to the voltage generated between the layers when the current flows through the conductor 31 in the state in which there is no insulating member 32.

As described above, according to the first embodiment, since the conductor 31 wound into a multiple-layered helical shape and the insulating member 32 provided between the layers of the conductor 31 are provided, the parasitic capacitance between the layers of the conductor 31 can be made small.

Note that, in the invention of the present application, any component of the embodiment may be modified, or any component of the embodiment may be omitted without departing from the scope of the invention.

INDUSTRIAL APPLICABILITY

The resonance-type power transfer coil according to the present invention can make the parasitic capacitance between the portions of the conductor small and is suitable to be used as the resonance-type power transfer coil or the like used for resonance-type power transfer.

REFERENCE SIGNS LIST

1: Primary power supply, 2: Resonance-type transmission power supply device, 3: Power transmitting coil (resonance-type power transfer coil), 4: Power receiving coil (resonance-type power transfer coil), 5: Receiving circuit, 6: Load, 31: Conductor, 32: Insulating member

The invention claimed is:

1. A resonance-type power transfer coil, comprising:
a conductor wound into a multiple-layered helical shape; and
an insulating member provided between layers of the conductor, wherein
each conductor wound into the multiple-layered helical shape is separated from any other conductor wound into the multiple-layered helical shape from a sectional view in all directions, and
each conductor wound into the multiple-layered helical shape is separated by the insulating member.

2. The resonance-type power transfer coil according to claim 1, wherein
a thickness of the insulating member is proportional to a voltage to be generated between the layers when a current flows through the conductor in a state in which there is no insulating member.

3. The resonance-type power transfer coil according to claim 1, wherein
the conductor is wound into a cylindrical, prismatic, or conical helical shape.

4. The resonance-type power transfer coil according to claim 1, wherein
the conductor is arranged alternately between the layers.

5. The resonance-type power transfer coil according to claim 1, wherein
the conductor is wound on an outermost layer in a direction opposite to a winding direction in other layers.

6. The resonance-type power transfer coil according to claim 5, wherein
a thickness of the insulating member is uniform between the outermost layer and a layer adjacent to the outermost layer, and is, between other layers, proportional to a voltage generated between the other layers when a current flows through the conductor in a state in which there is no insulating member.

7. A resonance-type power transfer coil, comprising:
a conductor wound into a multiple-layered helical shape; and
an insulating member provided between layers of the conductor, wherein
the conductor is wound on an outermost layer in a direction opposite to a winding direction in other layers, and
the outermost layer is concentrically stacked on a layer adjacent to the outermost layer.

8. The resonance-type power transfer coil according to claim 7, wherein the conductor is wound into a cylindrical, prismatic, or conical helical shape.

9. The resonance-type power transfer coil according to claim 7, wherein the conductor is arranged alternately between the layers.

10. The resonance-type power transfer coil according to claim 7, wherein
- a thickness of the insulating member is uniform between the outermost layer and the layer adjacent to the outermost layer, and
- the thickness of the insulating member is, between other layers, proportional to a voltage generated between the other layers when a current flows through the conductor in a state in which there is no insulating member, and is increased in a direction from one end opposed to a turning point to the other end opposed to a next fuming point of the conductor.

* * * * *